(12) United States Patent
Rubio et al.

(10) Patent No.: US 9,996,774 B2
(45) Date of Patent: Jun. 12, 2018

(54) PRINTERS AND METHODS OF CONTROLLING SAME

(71) Applicant: Hewlett-Packard Development Company, L.P., Fort Collins, CO (US)

(72) Inventors: Leticia Rubio, Sant Cugat del Valles (ES); Isabel Borrell, Sant Cugat del Valles (ES); Montserrat Solano, Sant Cugat del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/546,226

(22) PCT Filed: Apr. 17, 2015

(86) PCT No.: PCT/EP2015/058425
§ 371 (c)(1),
(2) Date: Jul. 25, 2017

(87) PCT Pub. No.: WO2016/165777
PCT Pub. Date: Oct. 20, 2016

(65) Prior Publication Data
US 2018/0018546 A1    Jan. 18, 2018

(51) Int. Cl.
*G06K 15/10* (2006.01)
*B41J 2/155* (2006.01)
(Continued)

(52) U.S. Cl.
CPC .......... *G06K 15/107* (2013.01); *B41J 2/1433* (2013.01); *B41J 2/155* (2013.01); *B41J 2/162* (2013.01);
(Continued)

(58) Field of Classification Search
CPC . B41J 2/1433; B41J 2/155; B41J 2/162; B41J 2/1753; B41J 2/17553; B41J 2/2146;
(Continued)

(56) References Cited

U.S. PATENT DOCUMENTS 6,450,614 B1 *   9/2002   Scheffelin ............ B41J 2/14024
                                                          347/13
6,659,581 B2 * 12/2003   Schloeman .......... B41J 2/04541
                                                          347/10
(Continued)

FOREIGN PATENT DOCUMENTS

EP         1543976        6/2005
WO     WO-2010087819      8/2010
WO     WO-2014051536      4/2014

OTHER PUBLICATIONS

PCT International Search Report and Written Opinion, dated Jan. 11, 2016, PCT Application No. PCT/EP2015/058425, European Patent Office, 12 pages.
(Continued)

*Primary Examiner* — Anh T. N. Vo
(74) *Attorney, Agent, or Firm* — HP Inc. Patent Department (57) ABSTRACT

A method of controlling a printer to print a pattern using a number of print head dies, each print head die including a number of nozzle trenches wherein each one of the number of nozzle trenches is associated with a different color, wherein the nozzles of neighboring dies overlap in respective overlap zones, the method comprising applying masks to the nozzles of neighboring dies in the respective overlap zones to distribute, in the overlap zones, the pattern to be printed between the nozzles of the respective neighboring dies, wherein the masks, in the overlap zones, retain the
(Continued)

order in which the nozzles of selected nozzle trenches associated with a selected one of the colors are fired.

15 Claims, 6 Drawing Sheets

(51) Int. Cl.
    *B41J 2/14* (2006.01)
    *B41J 2/21* (2006.01)
    *B41J 2/175* (2006.01)
    *B41J 2/16* (2006.01)

(52) U.S. Cl.
    CPC ......... *B41J 2/1753* (2013.01); *B41J 2/17553* (2013.01); *B41J 2/2146* (2013.01); *B41J 2202/19* (2013.01); *B41J 2202/20* (2013.01); *B41J 2202/21* (2013.01); *G06K 2215/0094* (2013.01)

(58) Field of Classification Search
    CPC ................ B41J 2202/19; B41J 2202/20; B41J 2202/21; G06K 15/107; G06K 2215/0094
    See application file for complete search history.

(56) References Cited

U.S. PATENT DOCUMENTS

| | | | |
|---|---|---|---|
| 7,118,188 | B2 | 10/2006 | Vilanova et al. |
| 7,417,768 | B1 | 8/2008 | Donovan et al. |
| 7,537,314 | B2 | 5/2009 | Silverbrook |
| 8,517,502 | B2 | 8/2013 | Mizes et al. |
| 8,573,725 | B2 | 11/2013 | Snyder et al. |
| 9,199,461 | B2 * | 12/2015 | Mackenzie .......... B41J 2/14072 |

OTHER PUBLICATIONS

Technology Backgrounder: HP Inkjet Web Press; May 1, 2009.

* cited by examiner

PRINTERS AND METHODS OF CONTROLLING SAME

BACKGROUND

Some printing devices having a carriage moving in a scanning direction may provide an efficient way of printing but can reach a limit in terms of throughput improvement because the carriage may need to cross a print medium for each scan. Another type of printer, called a page wide array printer, may comprise a bar of print heads spanning across the entire print zone and hence across an entire print medium. A page-wide array printer may allow printing a whole page in a continuous print media movement. A page-wide array printer may allow a high printing speed. It may comprise a number of print beads which are arranged along a print head axis direction adjacent to each other, and, as a set, extend across the entire print zone. The print head axis direction is perpendicular to the print media advance direction. Each print head may carry dies, each die providing a nozzle array. In order to avoid gaps between print heads during printing, e.g. due to the mechanical tolerances in the zones between the print heads, there may be an overlap between the nozzle arrays of adjacent print heads and between the nozzle arrays of adjacent dies to provide nozzle redundancy and to be able to compensate for any possible printing offset. Part of the image printed by the overlapping nozzles may be referred to as an overlap zone, and the remainder of the image, not printed by overlapping nozzle arrays, may be called a non-overlap zone.

DESCRIPTION OF DRAWINGS

Examples of this disclosure are described with reference to the drawings which are provided for illustrative purposes, in which.

DESCRIPTION OF EXAMPLES

According to one example, this disclosure provides a printer and a method of printing on a print medium as said print medium advances through a print zone. The printer may be a page-wide array printer. The page-wide array printer may include a number of print heads, the print heads carrying dies (also referred to as "dice") for providing arrays of nozzles which, in combination, extend across an entire print zone. Such an arrangement allows the entire width of a print medium to be printed simultaneously. Print media may be of any sort of sheet-like medium, including paper, cardboard, plastic sheets, and textile.

Due to the relative length of the print heads, when compared to their width, the set of print heads of a page-wide array printer also are called a print bar. The print bar may be mounted fixedly relative to the printer, and the print medium on which an image is to be printed is moved perpendicularly to the print bar through a print zone along a print media transport path. A complete image can be printed in a continuous movement of the print medium past the print bar.

In some examples, printers may be sensitive to local discontinuities in their nozzle arrays arranged in said print bar, e.g. when neighboring nozzle arrays are not perfectly aligned to each other. As printing is done in one pass (compared to several passes in the scanning printer case), it may be more difficult to hide defects caused by the variability of the printer itself. For example, the position of the print heads within the printer and the position of the print head dies or nozzle arrays relative to each other may have a variability of +/−100 µm. In order to avoid gaps between prim head dies due to the mechanical variability in the zones between the print head dies, there may be an overlap between bottom nozzles and top nozzles of pairs of adjacent nozzle arrays to provide nozzle redundancy and to be able to compensate for errors. The part of an image printed by these overlapping nozzles may be referred to as an overlap zone. Different masking strategies, using so-called weaving masks, may help to reduce the effect of print head position tolerances.

Nozzle redundancy in the overlap zone means that, to print a pixel, the printer can chose between two nozzles from overlapping dies to fire a resultant dot. Weaving masks are the masks which the printer can use to implement this strategy. Weaving masks can be two-dimensional binary arrays having a 1:1 relationship between the rows of the weaving mask and the nozzle of the trench in the overlap area. Two examples of weaving strategies are a random taper pair of weaving masks and a checker board pair of weaving masks. The random taper weaving masks use ramps which, in the overlap zone, increase nozzle usage from the overlapping end of a nozzle trench towards the nozzles in the non-overlap zone and, at the same time, randomize usage of nozzles. A checker board weaving mask uses e.g. every other nozzle of nozzle trenches in the overlap zone, with an offset of one nozzle from one pass to the next one.

Print heads may carry dies having four parallel nozzle trenches associated with four different colors, such as black (K), cyan (C), magenta (M) and yellow (Y), for example. As a result of print head architecture, which may provide a narrow distance between the nozzle trenches and several colorants in a single die and as a result of the overlapping or staggered arrangement of neighboring dies, different color inks may interact in a different way that causes a change of tone between inside and outside the overlap zone, depending on which inks are deposited in which sequence. For example, yellow ink may interact with darker color inks in a different way, depending on whether the yellow ink is deposited first or last and in which time sequence the yellow ink is deposited relative to the other colorants. This may cause image quality defects, in particularly in a one-pass print mode.

A method of controlling the printer to print a pattern using a number of print head dies is provided herein for printers where each print head die includes a number of nozzle trenches; wherein, in each die, each one of the number of nozzles trenches is associated with a different colorant, and wherein the nozzles of neighboring dies overlap in respective overlap zones. Masks are applied to the nozzles of neighboring dies in respective overlap zones to distribute, in the overlap zones, the pattern to be printed between the nozzles of the respective neighboring dies. The masks, in the overlap zones, retain the order in which the nozzles of selected nozzle trenches associated with a selected one of the colorants are fired. For example, the masks may determine that a selected color is always fired first or always fired last in a sequence of color deposition provided by the masks. Put differently, the masks determine the sequence in which nozzles of the different color trenches are fired wherein, for one of the colors, the position within said sequence, also referred to as order (position in the firing sequence), is frozen while the sequence of firing nozzles associated with the other colors may vary according to the weaving strategy, such as provided by a random taper weaving mask.

The printer may include a printer controller which receives print data corresponding to a pattern to be printed. The printer controller may include instructions to apply masks to the nozzles of neighboring dies in the respective overlap zones to distribute the pattern to be printed between the nozzles of respective neighboring dies. The printer controller then may control the print heads to fire the nozzle trenches according to the masking strategy applied.

The printer may be a page wide array printer including a print bar, the print bar carrying a number of print head dies which are staggered along two parallel lines extending in a print head axis direction so that respective two neighboring dies overlap in a respective overlap zone. Each of the dies may include a number of nozzle trenches wherein each of the number of nozzle trenches is associated with a different color. The printer may further include a printer controller, including instructions to apply masks to the nozzles of neighboring dies in the respective overlap zones to distribute, in the overlap zones, a pattern to be printed between the nozzles of the respective neighboring dies. The masks may enable respective first trenches associated with a first color of the dies which are arranged along one of the parallel lines to print the first color of the pattern in the overlap zone and disable the respective first trenches associated with the first color of the dies arranged along the other one of the parallel lines in the overlap zone. The dies arranged along the two parallel lines may be considered to form a first row of dies and a second row of dies in the media movement direction. i.e. a print medium passing under the print bar will first pass under the first row of dies and then under the second row of dies. By enabling the (selected) first color nozzle trenches along only one of the parallel lines, the first color will always be fired by the nozzles of either only the first row of dies or only the second row of dies and the order in which the (selected) first color is fired relative to the other colors can be frozen.

The printer also may be another type of printer having staggered print heads, i.e. print heads including overlapping, dies, and as a result generating different ink interactions inside and outside the overlap zone. Different ink interactions may be perceived as a change of tone which may occur at one-pass print modes where dots are fired very close in time and in dies with several colorants.

This concept may be better understood with reference to the following description of the drawings.

Figure 1:
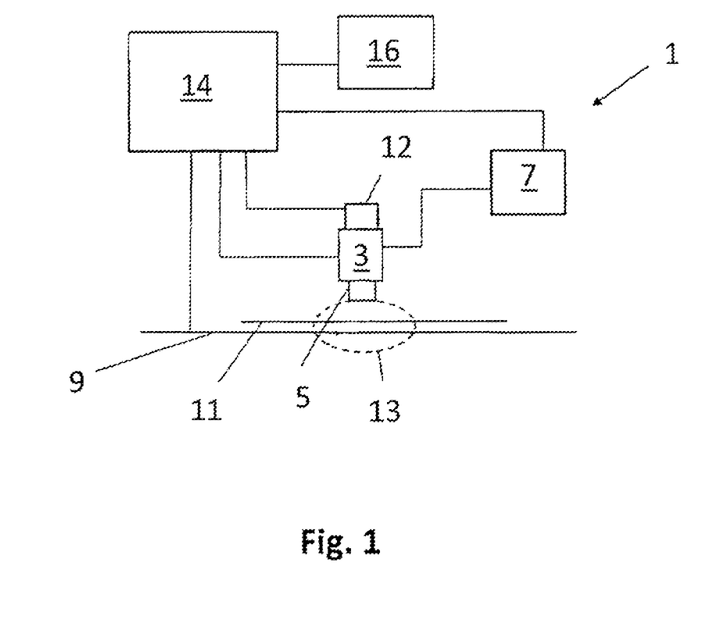
FIG. 1 shows a schematic drawing of a page-wide array printer according to one example.

FIG. 1 schematically shows a page-wide array printer 1 as one example of an environment in which the process described herein can be practiced. The printer 1 comprises a print head system 3 on which a print bar 5 is mounted. The print head system 3 comprises at least one print bar or a plurality of print bars (herein collectively referred to as "print bar 5"), such as for different type inks, for example. Ink is supplied to the print bar 5 from an ink tank 7.

The print bar comprises a number of nozzles (not shown in FIG. 1), the number of which can be several hundred, several thousand, or more. An example of the structure of the nozzles is described with reference to FIG. 2. The unit within the printer that does the actual printing also is referred to as print engine.

The printer 1 further comprises a print medium transport mechanism 9 which, in use, is to transport a print medium 11 to be printed upon through a print zone 13 below the print head array 3. The print media transport mechanism 9 is to transport the print medium through the print zone 13 in at least one direction.

A printer controller 14, such as a microprocessor, for example, is operative to control firing of the nozzles and the movement of the print media through the print zone 13. The printer controller 14 may include an image processor. The printer controller may also control the supply of ink to the print bar 5 from the ink tank 7. Instead of one controller, separate controllers could be installed for the print media transport mechanism 9, the print bar 5, and the ink supply from the tank 7. The controller has access to a memory 16. Images or jobs for the printer to print can be stored in the memory 16 until they are printed onto the print media by the printer. The printer controller 14 may store and run program modules for implementing the process according to examples as described herein. Program modules may be implemented in hardware, software, firmware and a combination thereof. Program modules also may be implemented in special purpose processors and may make use of the print engine.

Figure 2:
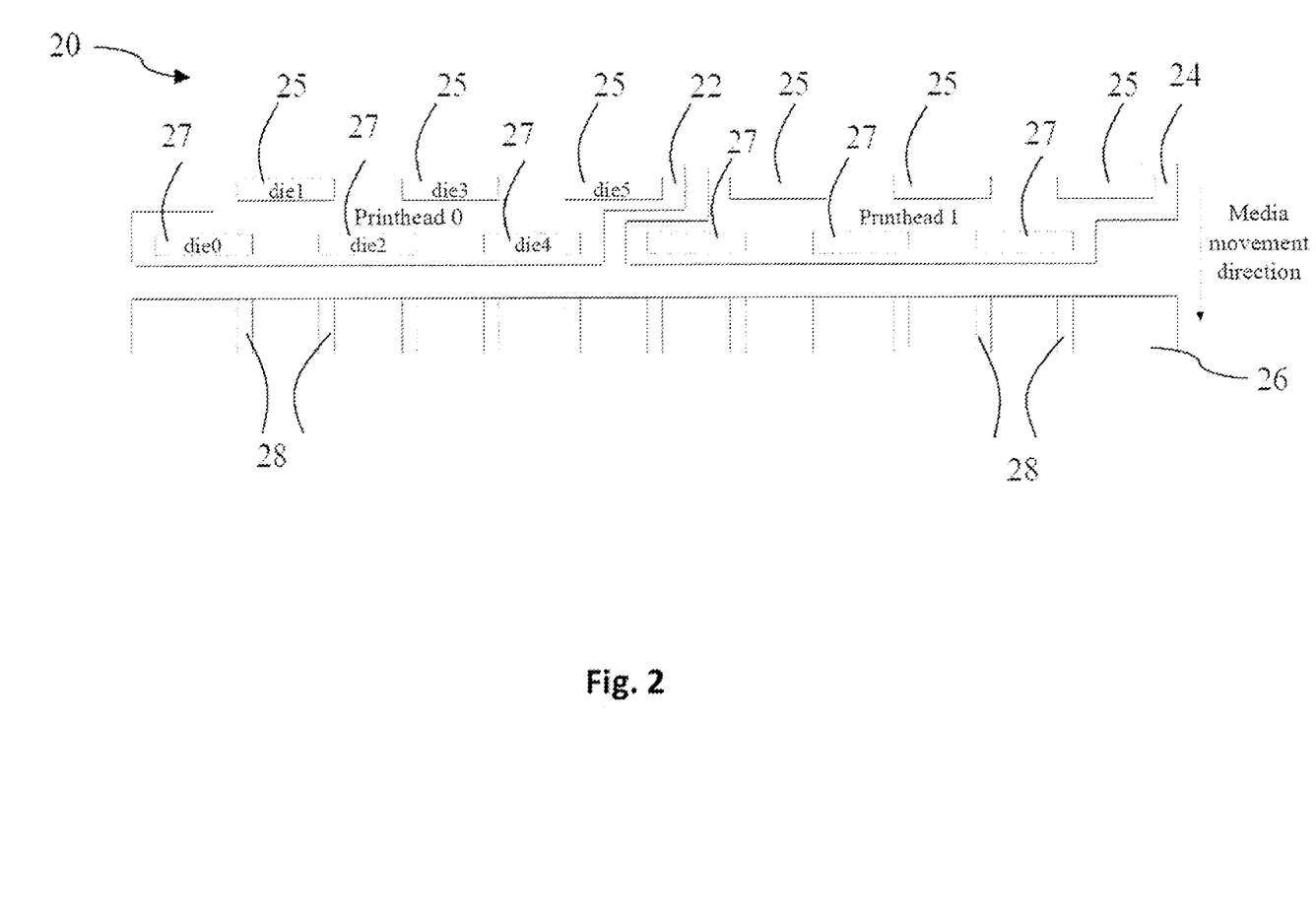
FIG. 2 shows a schematic drawing illustrating a print bar comprising two print heads in a page-wide array printer according to one example.

FIG. 2 schematically shows a print head architecture which can be used in the page wide array printer of FIG. 1 and illustrates how die overlap may appear along a print out. The page-wide array printer comprises a print bar 20 including a number of print heads 22, 24 which extends over the entire width of a print medium 26; thus, an entire page of the print medium can be printed with just one continuous media movement, orthogonal to the axis of the print heads 22, 24. Each print head comprises a number of dies 25, 27, each die 25, 27 providing an array of nozzles, also referred to as nozzle trench. Respective adjacent dies 25, 27 and their corresponding nozzle arrays overlap to a certain extent, wherein the overlap zones 28 are schematically indicated as respective stripes or zones on the print medium 26. The print head dies 25, 27 are arranged in two rows, including dies 25 and dies 27, respectively, which extend along two parallel lines. The row of the print head dies 25 can be considered to be a first row or front row in the media movement direction, and the row of dies 27 can be considered to be a second row or last row in the media movement direction. Media movement is indicated by the arrow on the right-hand side of the FIG. 2, and a print medium will first pass under the first row of dies 25 and then under the second row of dies 27.

Figure 3:
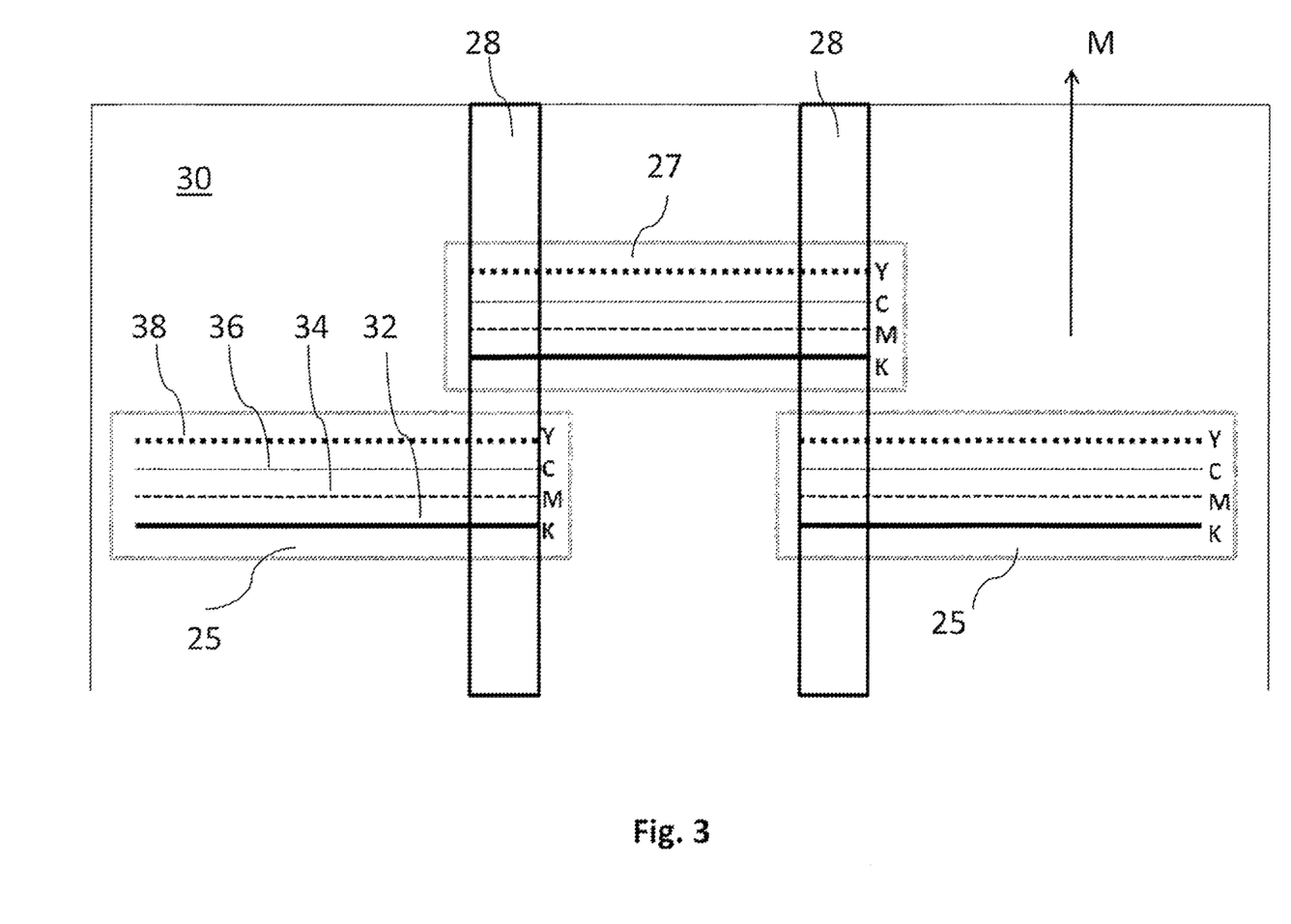
FIG. 3 shows an enlarged view of two overlapping dies according to one example.

FIG. 3 shows an enlarged view of three overlapping dies 25, 27, including two first dies 25 and one last die 27 in the media movement direction M. Each of the dies of this example comprises four nozzle trenches 32, 34, 36, 38 associated with four different colorants. In the example, nozzle trenches 32 are associated with black (K); nozzle trenches 34 are associated with magenta (M); nozzle trenches 36 are associated with cyan (C); and nozzle trenches 38 are associated with yellow (Y). Just as die 25 can be considered to be the first die and die 27 can be considered to be the last die in the media movement direction, trench 32 can be considered to be the first trench to fire and trench 38 can be considered to be the last trench to fire in the media movement direction, M. Reference numbers 32 to 38 are shown with reference to only one of the dies 25 to improve clarity of the drawing. However, in this example, the other dies are configured in the same way as said die 25. Further, the different colors are represented by differently dashed lines, a line of small squares representing yellow (Y), a fine dashed line representing cyan (C), a thicker dashed line representing magenta (M), and an even thicker solid line representing black (K).

FIG. 3 also illustrates two overlap zones 28 where the neighboring dies 25, 27 overlap, with the remainder of the print medium forming a non-overlap zone 30, where printing is performed by only single one of the dies, such as die 25 or die 27.

When printing in a single-pass unidirectional print mode, ink interactions in the non-overlap zone 30 are always the same because the relationship between the nozzles of the nozzle trenches is always the same and because different color inks are always fired in the same sequence, such as K, C, M, Y, in the present example. In the overlap zone 28, however, colorants can be fired in different sequences, selecting from the overlapping nozzle trenches 32 to 38, providing the color sequence K, M, C, Y; K, M, C, Y. Just looking at two of the colors, as an example, this means that black (K) can be printed before yellow (Y) or yellow (Y) can be printed before black (K), producing a dot of Y colorant on top of a dot of K colorant or vice versa. This further means that colors of high contrast, such as yellow (Y) and black (K) might be printed immediately one after the other if yellow (Y) is printed by the first die 25 and black (K) is printed by the second die 27. In at least one example, this type of printing sequence does not happen in the non-overlap zone 30 where the sequence of colors is fixed. Printed colorants interact in a different way, depending on the order in which they are printed on top of each other and depending on the time allowed between printing two dots of different colorant. Also depending on the print media, changing the order and time sequence in which different color inks are fired, different artefacts, such as different grain or color density, may be generated in the overlap zone 28 and in the non-overlap zone 30. This may be perceived by a user as an image quality defect due to the change of tone.

In one example of a page wide array printer a single print bar of print heads covering a whole paper width may comprise four, eight or more print heads, each of these print heads having four, six or more dies. There hence may be a considerable number of overlap zones where the different color inks interact differently from the non-overlap zones. Weaving masks may be applied to address some of these artefacts caused by tolerances of the individual dies 25, 27, in which the spread, the distance between drops, and drop shape are affected. Examples of the masks according to this disclosure take into account ink interaction caused by the sequence in which the trenches of overlapping dies 25, 27 are fired in the overlap zone 28. The masks take advantage of hardware design and trench positions in a die and three the trenches associated with a selected colorant, in the overlap zone 28, to always fire in the same order, i.e. at the same position within the sequence of firing nozzle trenches, such as always first, always last, always second, etc. In one example, the nozzle trench of the selected colorant may be forced to always fire last once all the rest of the trenches associated with different colorants have fired or to always fire first before the trenches associated with the other colorants are fired. The selected colorant may be yellow or another colorant having a high contrast to the remaining colorants. The selected colorant may be the lightest colorant which again may be yellow. The order in which the selected colorant is fired, e.g. last or first, may be the same order in which it is fired in the non-overlap zone 30.

In the example of FIG. 3, assuming that yellow is the selected color, yellow could be the color fired last in the non-overlap zone 30 because yellow, in each die 25, 27, is associated with the last nozzle trench 38 in the media movement direction M. Accordingly, in one example, when yellow is the selected color, the yellow nozzle trench 38 of the last (second) die 27 in the media movement direction M may be selected to fire in the overlap zone 38 and the yellow nozzle trench 38 of the first die 25 in the media movement direction M may be disabled. In this case, yellow dots are fired only from the last die 27 to ensure that yellow is always printed last, after all other colorants have been printed. Having regard to the remaining nozzle trenches 32, 34, 36, other weaving strategies may be applied.

In this example, the nozzle trenches of the selected color, within the overlap zone and in the non-overlap zone, are always fired in the same order or position within the firing sequence of nozzle trenches, more specifically, the nozzle trenches associated with yellow colorant are always fired last in a sequence of firing the four nozzle trenches of each die. Further, the sequence of firing nozzle trenches is determined in such a way that the selected nozzle trench is fired with a maximum time period between firing the selected nozzle trench and firing one of the other nozzle trenches associated with a color of highest contrast to the selected color. In this example, the time period between firing the yellow nozzle trench 38 and the black nozzle trench 32 is as long as it can be because the yellow nozzle trench 38 of the first die 27 is always fired last, with a maximum distance to the black nozzle trenches 32 of the first and second dies 25, 27. This rule could not be observed if the yellow nozzle trench 38 of the first die 25 was used because this trench is close to the black nozzle trench 32 of the last (second) die 27.

When nozzle trenches are arranged in a different order within the dies and relative to the direction of media movement M, the order in which the selected nozzle trenches are fired within the sequence of firing can be different. For example, if media movement would be opposite to the direction shown in FIG. 3, a masking strategy could be to select nozzle trench 38, i.e. yellow, of die 27 to always fire first.

Figure 4:
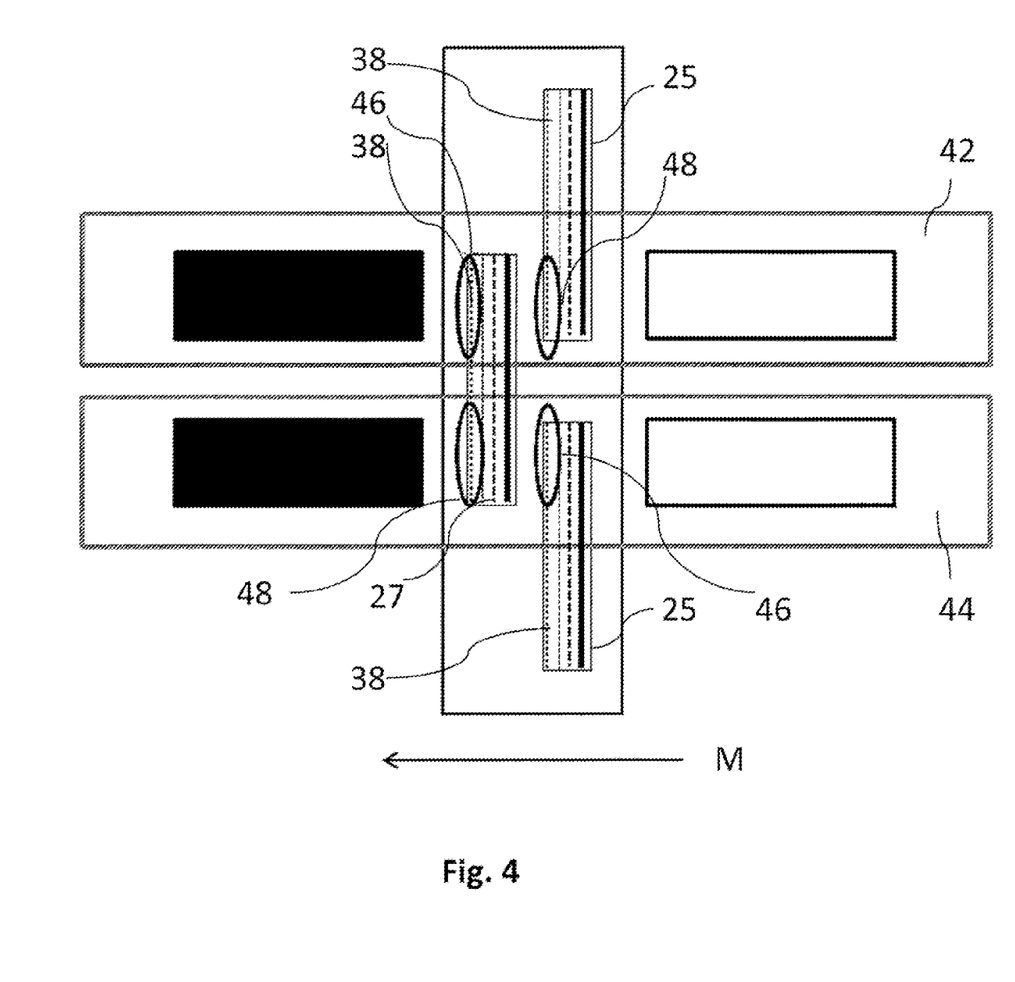
FIG. 4 shows one example of masks applied to selected nozzle trenches of overlapping dies.

One masking strategy applied to the dies in the overlap zone is now described with reference to FIG. 4. The example of FIG. 4 illustrates two overlap zones 42, 44 of three neighboring staggered dies 25, 27, with two 25 of the dies being first dies in the media movement direction and one 27 of the dies being a last dies relative to the media movement direction. FIG. 4 illustrates only that part of the weaving masks which is applied to the nozzle trenches associates with the selected color, in the example to nozzle trenches 38 for firing yellow colorant, (Y). Reference numbers of the other nozzle trenches are omitted from FIGS. 4 and 5 to improve clarity of the drawings. Looking at FIG. 4, the masking strategy is explained with reference to the orientation of the dies 25, 27 as shown in FIG. 4, with each die considered to extend from a top end to a bottom end, hi the example of FIG. 4, the masking strategy hence applies a mask referred to as a full top weaving mask in overlap zone 42 and a mask referred to as a full bottom weaving mask in the neighboring overlap zone 44. A full top weaving mask designates a mask where all of the nozzles of a top section 46 of a nozzle trench 38, and none of the nozzles of a bottom section 48 of the selected nozzle trench 38 are used in the overlap zone 42. A full bottom weaving mask is a mask where all of the nozzles of a bottom section 48 of a selected trench 38, and none of the nozzles of a top section 46 of a selected nozzle trench 38 are used in the overlap zone 44. This full top/full bottom weaving mask strategy, which is applied in neighboring overlap zones, has the result that within the overlap zones 42, 44, only the selected nozzle trenches 38 of half of the dies 25, 27 are used, with the other half not being used to print the selected colorant Y in the overlap zones 42, 44. This selection can be expressed in different ways:

For example, if it is assumed that the dies are arranged along two parallel lines, with dies 25 arranged on one line and dies 27 arranged on the other line, only the dies arranged on one of the lines will be used for printing the selected colorant in the overlap zone. Put differently, assuming that the dies are arranged to extend along a print head axis direction and are staggered in a direction perpendicular thereto, the asking strategy results in using only the selected trenches of every second die for firing the selected colorant, counting the dies in the print head axis direction. Put even differently, the weaving mask strategy may result in using, in the overlap zone, only those trenches associated with the selected color which are first or last in a media movement direction. Expressed in the above full top/full bottom strategy, only the top or bottom nozzles of one of two overlapping dies are selected to get the same ink interactions inside and outside the overlap zone resulting in a constant tone between dies and improving area fill uniformity.

Depending on how the orientation of the print heads is defined, such as top to bottom or right to left, the weaving strategy can be designated differently.

Figure 5:
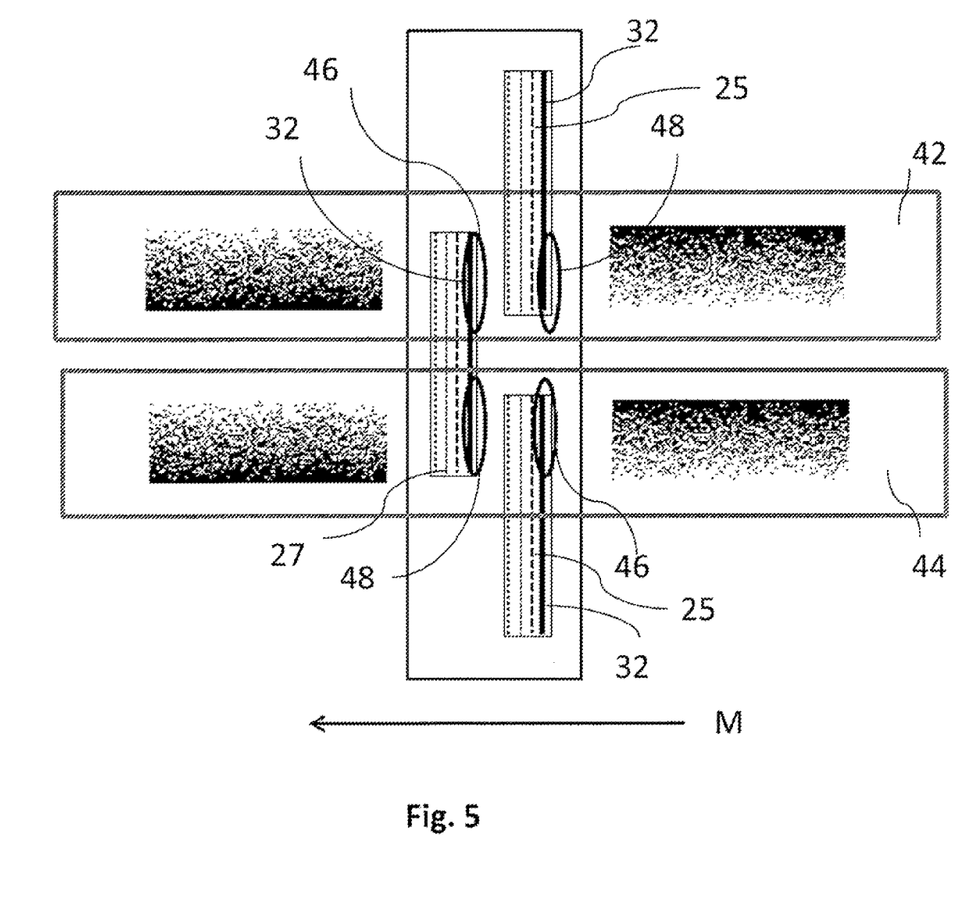
FIG. 5 shows an example of masks applied to non-selected nozzle trenches of overlapping dies.

FIG. 5 shows an example of a weaving mask strategy which can be applied to the remaining nozzle trenches associated with colors other than the selected color. In the example of FIG. 5, a weaving mask applied to trench 32 associated with black (K) is shown. In this example, the same weaving mask is applied in all overlap zones 42, 44 within the same colorant, in the example black. The example of FIG. 5 shows a random taper weaving mask applied to the top and bottom nozzle sections 46, 48 in the overlap zones 42, 44. Other weaving mask strategies can be used.

Figure 6:
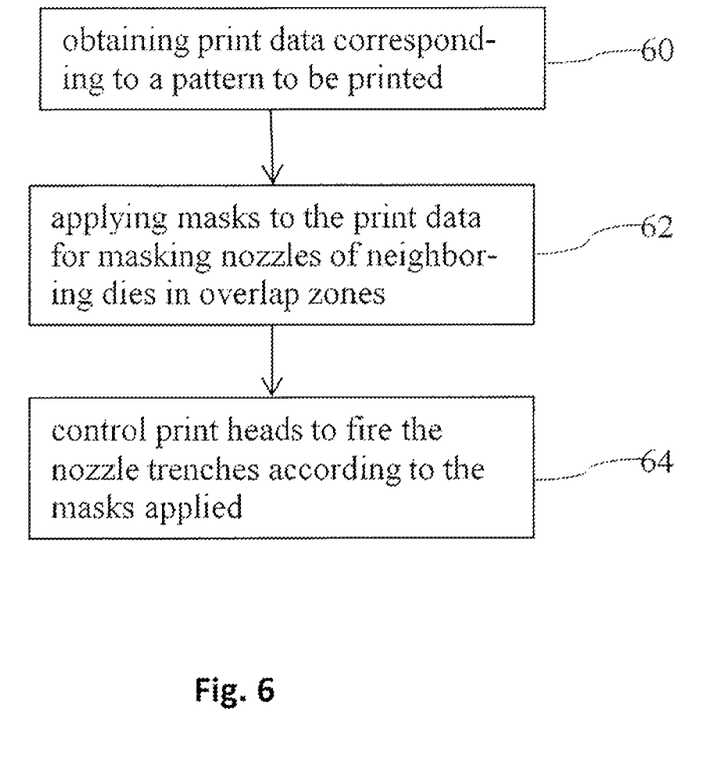
FIG. 6 shows a flow diagram of a method according to one example of controlling a printer.

FIG. 6 illustrates a flow diagram of one example of a method of controlling a printer according to this disclosure. The printer includes a number of print head dies, each printer die including a number of nozzle trenches wherein each one of the number of nozzle trenches is associated with different color. The nozzles of neighboring dies overlap in respective overlap zones. The method may comprise obtaining print data corresponding to a pattern to be printed, at 60; applying masks to the print data for masking nozzles of neighboring dies in the respective overlap zones to distribute, in the overlap zones, the pattern to be printed between the nozzles of the respective neighboring dies, at 62. As explained above, a masking strategy may be applied wherein the masks, in the overlap zones, retain the order in which the nozzles of selected nozzle trenches associated with the selected one of the colors are fired. The printer then controls the print heads to fire the nozzle trenches according to the masking strategy applied, at 64.

The invention claimed is:

1. A method of controlling a printer, the method comprising:
controlling, using a printer controller, a print engine to print a pattern using a number of print head dies, each print head die including a number of nozzle trenches wherein each one of the number of nozzle trenches is associated with a different color, wherein the nozzles of neighboring dies overlap in respective overlap zones, and applying masks to the nozzles of neighboring dies in the respective overlap zones, using the printer controller, to distribute, in the overlap zones, the pattern to be printed between the nozzles of the respective neighboring dies, wherein the masks, in the overlap zones, retain the order in which the nozzles of selected nozzle trenches associated with a selected one of the colors are fired.

2. The method of claim 1 wherein the nozzles of the selected nozzle trenches, in the overlap zone, are controlled to be fired after the nozzles of all other nozzle trenches have been fired.

3. The method of claim 1 wherein the nozzles of the selected nozzle trenches, in the overlap zone, are controlled to be fired before the nozzles of all other nozzle trenches are fired.

4. The method of claim 1 wherein the print head dies extend along a print head axis direction and neighboring dies are staggered in a direction perpendicular thereto so that respective two neighboring dies overlap wherein the printer controller applies said masks to enable the selected nozzle trench of only each second die to print that part of the pattern associated the selected color in the overlap zone.

5. The method of claim 1 wherein the print head dies extend along a print head axis direction and are arranged along two parallel lines in a print head axis direction wherein the printer controller applies said masks to enable only the dies arranged on one of the lines to print that part of the pattern associated with the selected color in the overlap zone.

6. The method of claim 1 wherein the print head dies extend along a print head axis direction and are staggered in a direction perpendicular thereto, the print head dies extending from a top print head to a bottom print head, wherein the printer controller applies, to the selected nozzle trenches, a full top masking strategy in one overlap zone and a full bottom masking strategy in the next overlap zone.

7. The method of claim 6 wherein the full top masking strategy enables all of the top nozzles of the selected nozzle trench of one die and none of the bottom nozzles of the selected nozzle trench of the neighboring die in the respective overlap zone and the full bottom masking strategy enables all of the bottom nozzles of the selected nozzle trench of one die and none of the top nozzles of the selected nozzle trench of the neighboring die in the respective overlap zone.

8. The method of claim 1 wherein the print head dies extend along a print head axis direction and neighboring dies are staggered in a media advance direction perpendicular to the print head axis direction, so that respective two neighboring dies overlap, wherein each print head die includes four nozzle trenches associated with four colors, wherein the four colors, in the media advance direction, are yellow, magenta, cyan, black, or black, cyan, magenta yellow.

9. The method of claim 1 wherein the selected color is one having the highest contrast to the darkest one of all other colors associated with the number of nozzle trenches.

10. A printer including
a number of print head dies, each print head die including a number of nozzle trenches wherein each one of the number of nozzle trenches is associated with a different color, wherein the nozzles of neighboring dies overlap in respective overlap zones; and
a printer controller, the printer controller including a module to apply masks to the nozzles of neighboring dies in the respective overlap zones to distribute, in the overlap zones, a pattern to be printed between the nozzles of the respective neighboring dies, wherein the masks, in the overlap zones, retain the order in which the nozzles of selected nozzle trenches associated with a selected one of the colors are fired, and a module to control said number of print head dies to print a pattern.

11. The printer of claim 10 wherein the print head dies are arranged on a print bar of a page wide array printer.

12. The printer of claim 10 wherein each print head die includes four nozzle trenches associated with four colors, wherein the four colors, in a media advance direction, are yellow, magenta, cyan, black, or are black, cyan, magenta yellow.

13. The printer of claim 12 wherein the selected color is yellow.

14. A page wide array printer including a print bar, the print bar carrying a number of print head dies which are staggered along two parallel lines extending in a print head axis direction so that respective two neighboring dies overlap in a respective overlap zone, each die including a number of nozzle trenches, each of the number of nozzle trenches associated with a different color, the printer further including a printer controller, the printer controller including a module to apply masks to the nozzles of neighboring dies in the respective overlap zones to distribute, in the overlap zones, a pattern to be printed between the nozzles of the respective neighboring dies, wherein the masks enable respective first trenches associated with a first color of the dies arranged along one of the parallel lines to print the first color of the pattern in the overlap zone and disables the respective first trenches associated within first color of the dies arranged along the other one of the parallel lines; and a module to control said number of print head dies to print said pattern.

15. The printer of claim 14 wherein the first color is yellow.

* * * * *